US007647239B2

(12) United States Patent
Macdonald

(10) Patent No.: US 7,647,239 B2
(45) Date of Patent: Jan. 12, 2010

(54) METHODS AND SYSTEMS FOR SMOOTHING OF THE ASSUMED LONG-TERM DISCOUNT RATE FOR PENSION PLANS AND ACTUARIAL VALUATIONS

(75) Inventor: Edward Macdonald, Roswell, GA (US)

(73) Assignee: Edward A. Macdonald, Kennesaw, GA (US)

(*) Notice: Subject to any disclaimer, the term of this patent is extended or adjusted under 35 U.S.C. 154(b) by 1242 days.

(21) Appl. No.: 10/938,449

(22) Filed: Sep. 10, 2004

(65) Prior Publication Data
US 2005/0015284 A1 Jan. 20, 2005

Related U.S. Application Data

(60) Provisional application No. 60/502,694, filed on Sep. 12, 2003.

(51) Int. Cl.
G06Q 40/00 (2006.01)
(52) U.S. Cl. ............... 705/4; 705/35; 705/36 R; 705/36 T; 705/37
(58) Field of Classification Search ......... 705/35–45
See application file for complete search history.

(56) References Cited

U.S. PATENT DOCUMENTS

| | | | | | |
|---|---|---|---|---|---|
| 4,752,877 | A | * | 6/1988 | Roberts et al. ............. | 705/36 R |
| 5,987,433 | A | * | 11/1999 | Crapo ....................... | 705/36 R |
| 6,055,517 | A | * | 4/2000 | Friend et al. ............... | 705/36 R |
| 6,219,650 | B1 | * | 4/2001 | Friend et al. ............... | 705/36 R |
| 6,336,103 | B1 | * | 1/2002 | Baker ........................ | 705/36 R |
| 6,415,268 | B1 | * | 7/2002 | Korisch ..................... | 705/36 R |
| 6,564,191 | B1 | * | 5/2003 | Reddy ....................... | 705/36 R |
| 6,963,852 | B2 | * | 11/2005 | Koresko, V ................ | 705/35 |
| 6,985,880 | B1 | * | 1/2006 | Hodgdon et al. .......... | 705/36 T |
| 7,120,601 | B2 | * | 10/2006 | Chen et al. ................ | 705/36 R |
| 7,149,719 | B2 | * | 12/2006 | Schulman .................. | 705/37 |
| 7,392,202 | B1 | * | 6/2008 | O'Brien ..................... | 705/4 |

(Continued)

FOREIGN PATENT DOCUMENTS

WO  PCT/IB2003/006312  *  3/2004

OTHER PUBLICATIONS

Owadally, Iqbal and Haberman, Steven, The Treatment of Assets in Pension Funding, Astin, vol. 34 No. 2, Nov. 2004.*
Kellison, Stephen G., The Theory Of Interest, 1970, pages-contents (3pgs) and pp. 1-30, Richard D. Irwin, Inc., Homewood, Illinois.

(Continued)

Primary Examiner—Charles R Kyle
Assistant Examiner—Robert R Niquette
(74) Attorney, Agent, or Firm—Baker Donelson

(57) ABSTRACT

Methods and computer systems provide for the determination of employer liabilities and resulting contributions to pension plans by utilizing a smoothed discount rate in place of an assumed long-term discount rate. A compounded expected cumulative return on market value over a period of time that is based on the assumed long-term discount rate is found. A compounded actual return on market value over the chosen look-back period is also found. An adjusted expected rate of return over a future period of time remaining in an assumed period of time is then found based on the compounded expected return and the compounded actual return. The smoothed discount rate to be used in place of the assumed long-term discount rate is then based on the adjusted expected return.

25 Claims, 2 Drawing Sheets

U.S. PATENT DOCUMENTS

2002/0198802 A1* 12/2002 Koresko, V ................... 705/35
2003/0126054 A1*  7/2003 Purcell, Jr. .................... 705/36
2003/0233301 A1* 12/2003 Chen et al. .................... 705/36
2004/0225591 A1* 11/2004 Chiappetta et al. ............ 705/36

OTHER PUBLICATIONS

Thuesen, H.G.; Fabrycky W.J.; Thuesen, G.J.; Engineering Economy, 1971, pages cover of book and pp. 56-65, 4th edition, Prentice-Hall, Inc., Englewood Cliffs, New Jersey.

* cited by examiner

METHODS AND SYSTEMS FOR SMOOTHING OF THE ASSUMED LONG-TERM DISCOUNT RATE FOR PENSION PLANS AND ACTUARIAL VALUATIONS

RELATED APPLICATIONS

This application claims priority to U.S. Provisional Application 60/502,694 filed on Sep. 12, 2003, and entitled SMOOTHING OF THE DISCOUNT RATE FOR PENSION PLANS AND ACTUARIAL VALUATIONS, which is incorporated herein by reference.

TECHNICAL FIELD

The present invention is related to the funding of pension plans. More particularly, the present invention is related to the computation of employer liabilities and the resulting contributions that are required to be made for the pension plans according to actuarial valuations involving use of a smoothed discount rate.

BACKGROUND

The assumed long-term discount rate is the interest rate used to determine the liabilities of a defined benefit retirement system (system) or pension plan. The assumed long-term discount rate is known by various terms including the investment return assumption and is the rate that is used to adjust a series of future payments to reflect the time value of money. The assumed long-term discount rate is the rate of investment return, typically on an annual basis, that an actuary believes the system will earn in the market on average over a long period of time, such as 30 or 40 years. The assumed long-term discount rate along with application of a funding method and other actuarial assumptions allows for a calculation of liabilities and the determination of what an employer's periodic contribution to the pension plan must be. The goal is to fund promised benefits at some point in the future by making contributions that will earn a return on investment up to that future time. The higher the assumed long-term discount rate is, the lower the liabilities are of a system and the lower the periodic employer contributions are that are required to fund the system.

The actuary will take into consideration the investment allocation of the system when selecting a long-term discount rate to be assumed for the system. Generally, the higher the equity exposure of a system, the higher the assumed long-term discount rate will be. Conversely, a system that has a higher fixed income or bond exposure will likely have a lower assumed long-term discount rate.

The actuary recognizes that the asset gains and losses will occur when the market returns are either higher or lower than the assumed long-term discount rate. However, since the actuary does not select long-term assumptions based on annual gains and losses, the actuary does not try to mimic current market conditions but instead looks at the long term (e.g. 30 or 40 years). During an up market, the assumed long-term discount rate may be lower than actual market returns. During a down market, the assumed long-term discount rate may be higher than actual market returns. Conventionally, there is no recognition by the system employing the assumed long-term discount rate that actual future returns must be higher when there are asset losses in order for the assumed long-term discount rate to be accurate over time. Nor is there recognition by the system employing the assumed long-term discount rate that actual future returns must be lower when there are asset gains in order for the assumed long-term discount rate to be accurate over time.

There are unfortunate consequences to not recognizing the effects that asset gains and losses have on future returns and thereby not adjusting employer contributions accordingly. For example, the extraordinary market returns over the 1990's were on average much higher than the assumed long-term discount rates during the same period. The economic times were good and although the employers had money in their budgets, they generally utilized the asset gains to pay for benefit improvements or employer contribution decreases. However, in the early part of the subsequent decade, the equity markets deteriorated and the investment performance was poor. This caused asset losses that started to drive up the cost of pension plans and required increases in the employer contribution rates at a time when employers had budget deficits and were looking to cut expenditures.

SUMMARY

Embodiments of the present invention address these issues and others by providing methods and computer systems that find a smoothed discount rate and employ the smoothed discount rate in place of the assumed long-term discount rate when determining liabilities and the resulting employer contributions. The smoothed discount rate is based at least on past actual returns and the assumed long-term discount rate. The smoothed discount rate has a value less than the assumed long-term discount rate in response to periods of up markets when there were assets gains. Conversely, the smoothed discount rate has a value greater than the assumed long-term discount rate in response to periods of down markets when there were asset losses. Accordingly, employer contributions are higher in response to previous up markets, when extra monies are generally available and when contributing and investing larger amounts in an up market will increase the investment return of the system. Conversely, employer contributions are lower in response to previous down markets, when extra monies are not available and additional cuts in expenditures are typically sought and when decreasing contributions in a down market limits asset losses.

One embodiment of the present invention is a computer-implemented method of determining employer liabilities and a resulting contribution to a pension plan. A processor is configured with a set of instructions that when implemented by the processor comprise the steps of method. The method involves first determining a smoothed discount rate based at least on an assumed long-term discount rate and an actual return on market value for one or more preceding time periods. The smoothed discount rate is determined by the steps:

(a) determining a compounded expected return over a period of time based on the assumed long-term discount rate;

(b) determining a compounded actual return over a look-back period;

(c) computing an adjusted expected rate of return over a future period of time remaining in the period of time based on the compounded expected return and the compounded actual return;

(d) based on a corridor C, determining an upper limit and a lower limit of a range about the assumed long term discount rate, where the upper limit equals the assumed long term discount rate times the value (1+C) and the lower limit equals the assumed long term discount rate times the value (1−C); and (e) setting the smoothed discount rate when:
  i) the adjusted expected rate of return is less than or equal to the upper limit and greater than or equal to the lower limit, then the smoothed discount rate is set to equal to the adjusted expected rate of return;
  ii) the adjusted expected rate of return is greater than the upper limit, then the smoothed discount rate is set equal to the upper limit, and
  iii) the adjusted expected rate of return is less than the lower limit, then the smoothed discount rate is set equal to the lower limit;

The method further involves utilizing the smoothed discount rate in place of the assumed long-term discount rate when determining the employer liabilities and the resulting contribution of monies to the pension plan. The method then involves transferring the resulting contribution of monies to a fund that holds pension plan monies.

Another embodiment of the present invention is a computer system for determining actuarial valuations. The computer system includes a processor for implementing a set of instructions and also includes storage containing the set of instructions. When implemented by the processor, the set of instructions cause the processor to determine a smoothed discount rate based at least on an assumed long-term discount rate and an actual return on market value for one or more preceding years. The smoothed discount rate is determined by the steps:

(a) determining a compounded expected return over a period of time based on the assumed long-term discount rate;

(b) determining a compounded actual return over a look-back period;

(c) computing an adjusted expected rate of return over a future period of time remaining in the period of time based on the compounded expected return and the compounded actual return;

(d) based on a corridor C, determining an upper limit and a lower limit of a range about the assumed long term discount rate, where the upper limit equals the assumed long term discount rate times the value (1+C) and the lower limit equals the assumed long term discount rate times the value (1−C); and (e) setting the smoothed discount rate when:
  i) the adjusted expected rate of return is less than or equal to the upper limit and greater than or equal to the lower limit, then the smoothed discount rate is set to equal to the adjusted expected rate of return;
  ii) the adjusted expected rate of return is greater than the upper limit, then the smoothed discount rate is set equal to the upper limit, and
  iii) the adjusted expected rate of return is less than the lower limit, then the smoothed discount rate is set equal to the lower limit.

The smoothed discount rate is used in place of the assumed long-term discount rate when determining actuarial valuations.

Another embodiment of the present invention is a method of determining employer liabilities and a resulting contribution to a pension plan. The method involves choosing a look-back period and using a processor configured with a set of instructions that when implemented. determine a smoothed discount rate based at least on an assumed long-term discount rate and an actual return on market value for the chosen look-back period. The steps of determining the smoothed discount rate, comprise:

(i) determining a compounded expected return over a period of time based on the assumed long-term discount rate;

(ii) determining a compounded actual return over the look-back period;

(iii) computing an adjusted expected rate of return over a future period of time remaining in the period of time based on the compounded expected return and the compounded actual return;

(iv) based on a corridor C, determining an upper limit and a lower limit of a range about the assumed long term discount rate, where the upper limit equals the assumed long term discount rate times the value (1+C) and the lower limit equals the assumed long term discount rate times the value (1−C); and (v) setting the smoothed discount rate when:
  a) the adjusted expected rate of return is less than or equal to the upper limit and greater than or equal to the lower limit, then the smoothed discount rate is set to equal to the adjusted expected rate of return;
  b) the adjusted expected rate of return is greater than the upper limit, then the smoothed discount rate is set equal to the upper limit, and
  c) the adjusted expected rate of return is less than the lower limit, then the smoothed discount rate is set equal to the lower limit.

The method further involves utilizing the smoothed discount rate in place of the assumed long-term discount rate when determining the employer liabilities and resulting contribution of monies to the pension plan. The resulting contribution of monies are transferred to a fund holding pension plan monies.

DETAILED DESCRIPTION

Embodiments of the present invention smooth the discount rate in relation to the actual return on market value of the assets of the pension plan and employ the smoothed discount rate in place of the assumed long-term discount rate to determine the liabilities and resulting employer contributions. The smoothed discount rate allows for the recognition of the cyclical nature of markets and for contributing counter-cyclically. The application of the smoothed discount rate provides for contributions greater than those called for by the assumed long-term discount rate in response to up markets and provides for contributions lower than those called for by the assumed long-term discount rate in response to down markets. Accordingly, the smoothed discount rate assists the employer in making contributions by preventing the employer from choosing to decrease contributions in response to asset gains and thereby being forced to increase contributions in response to asset losses.

Figure 1:
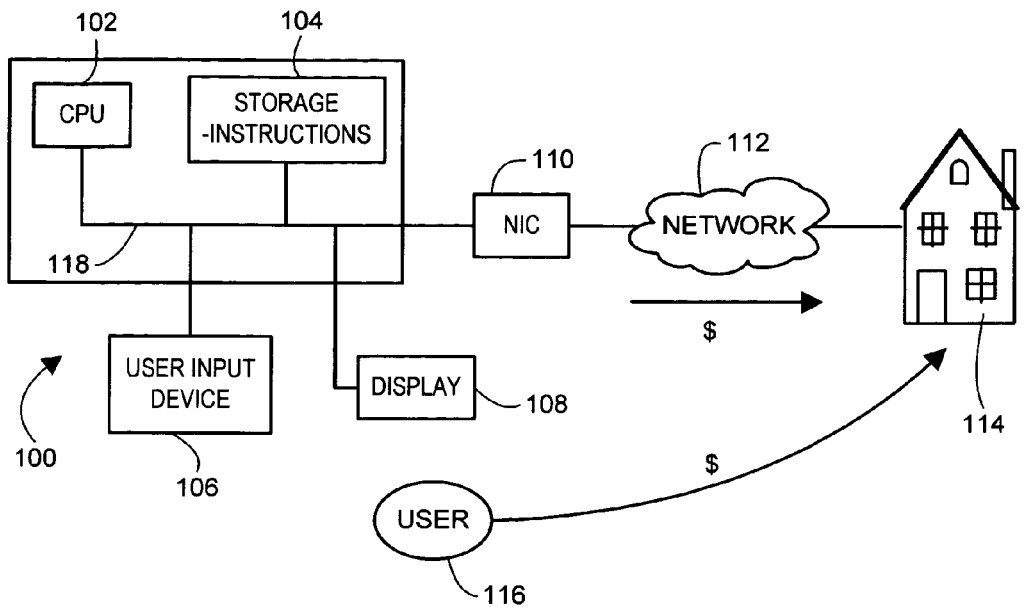
FIG. 1 illustrates one example of a computer system for employing various embodiments of the present invention.

FIG. 1 shows an example of a computer system 100 for implementing embodiments of the present invention. The computer system 100 is a standard computer system, including a central processing unit (CPU) 102, storage 104 including but not limited to solid state memory, magnetic storage, and/or optical storage, user input devices 106 including but not limited to a keyboard and mouse, and a display device 108. These elements are interconnected by one or more data busses 118. Additionally, the computer system 100 may communicate over a network 112, such as a dedicated private network or a public network such as the Internet, via a network interface card (NIC) 110.

The storage 104 of the computer system 100 includes computer code that provides processing instructions to the CPU 102. The computer system 100 may be a general-purpose computer system such that the storage 100 includes an operating system that allows for the operation of various application programs. In that case, the application programs provide instructions to cause the CPU 102 to perform various tasks. In relation to the present invention, an application program or a portion thereof may be dedicated to the calculation and subsequent use of a smoothed discount rate. In other examples, the computer system 100 may be a dedicated-purpose device where the storage includes instructions that are exclusively for tasks such as the calculation and subsequent use of the smoothed discount rate.

The instructions utilize values within equations to determine the smoothed discount rate. However, the instructions may be configured so that the processor 102 prompts a user via display 108 or other output device to enter values necessary for the calculations. Table 1 below sets forth the variables that are used to calculate the smoothed discount rate, and Table 2 below sets forth an illustrative set of equations that utilize the values to provide the smoothed discount rate.

TABLE 1

| Variable | Description |
| --- | --- |
| D | The assumed long-term discount rate initially chosen by the actuary for the plan. |
| N | The number of time periods (e.g., years) for which the assumed long-term discount rate is assumed to apply. |
| P | The number of look-back time periods. |
| C ($C_{max}$, $C_{min}$) | The percentage maximum and minimum relationship between the assumed long-term discount rate and the smoothed discount rate. |
| E | The compounded expected cumulative valued based on the assumed long-term discount rate. |
| A(I) | The actual return on market value in time period I. |
| A | The compounded actual cumulative value based on an actual rate of return on market value. |
| AEI | The adjusted expected rate of return on market value. |
| S | The smoothed discount rate. |

TABLE 2

| Variable | Equation |
| --- | --- |
| E | $(1 + D)^N$ |
| A | $((1 + A(1)) * (1 + A(2)) * \ldots (1 + A(P)))$ |
| AEI | $(E/A)^{(1/(N-P))} - 1$ |
| S | AEI if no corridor |
| S | AEI if AEI less than or equal to $D * (1 + C)$ and AEI greater than or equal to $D * (1 - C)$ |
| S | $D * (1 + C)$ if AEI greater than $D * (1 + C)$ |
| S | $D * (1 - C)$ if AEI less than $D * (1 - C)$ |

It will be appreciated that in certain embodiments, the instructions may be hard-coded with some or all of the values of Table 1. In other embodiments, some or all of the values are provided by the user or other resource upon being prompted. As an example, the computer system 100 may be configured to always use a particular look-back period, assumed long-term discount rate, long-term period, and/or corridor while the application receives the actual return on market values as input, such as input provided by the user or provided from an external system. As another example, the computer system 100 may be configured to use a particular assumed long-term discount rate and long-term period but receive the other values as input. Furthermore, certain values may be received as input upon the first use of the application but are stored in memory and then recalled upon subsequent uses, such as the assumed long-term discount rate, long-term period, and the actual compounded return on market value from the preceding years.

While Table 1 provides an example of variables and Table 2 provides one example of a set of equations used when calculating S, it will be appreciated that there are other manners of calculating a smoothed discount rate based on the assumed long-term discount rate and previous actual returns. Additionally, it will be appreciated that there are mathematical equivalents to these sets of equations of Table 2 that are equally applicable within embodiments of the present invention. For instance, Tables 1 and 2 rely upon a compounded expected cumulative value based on the discount rate and actual cumulative values based on actual rates of return when finding the adjusted expected rate of return. However, an alternative is to express the compounded expected and compounded actual cumulative values as compounded expected and compounded actual rates of returns, and the term return as used herein is intended to encompass both the cumulative value and the rate of return. Accordingly, the present invention is not intended to be limited to the use of this specific set of variables and equations of Tables 1 and 2 when finding a smoothed discount rate.

Upon calculating S through one of the techniques discussed above, the computer system 100 may then apply S, the smoothed discount rate, in place of D, the assumed long-term discount rate, within standard actuarial valuations used to determine the liabilities and resulting employer contributions for a given point in time. The standard actuarial valuations for finding the liabilities and resulting contributions are well-known to those of ordinary skill in the art and are not discussed further herein. These standard actuarial valuations are set forth within any one of various references such as the Actuarial Standards of Practice (ASOP), the Governmental Accounting Standards Board (GASB25, GASB27), the Financial Accounting Standards Board (FASB87), the Glossary of Actuarial Terms, etc.

Returning to FIG. 1, upon calculating S, the computer system 100 may display the calculated value to the user via display device 108. Furthermore, the computer system 100 may employ S to determine the liabilities and the required contributions that result therefrom, and the computer system 100 may then provide this amount via the display 108. The computer system 100 may also initiate an electronics fund transfer via the NIC 110 connection through the network 112 to a banking institution 114. The fund transfer may alternatively be carried out by a user 116. As an alternative to the computer system 100 calculating the employer contribution and/or initiating the electronic fund transfer, the computer system 100 may provide S to another computer system that may then calculate the liabilities and resulting employer contribution and/or may initiate the electronic fund transfer.

Figure 2:
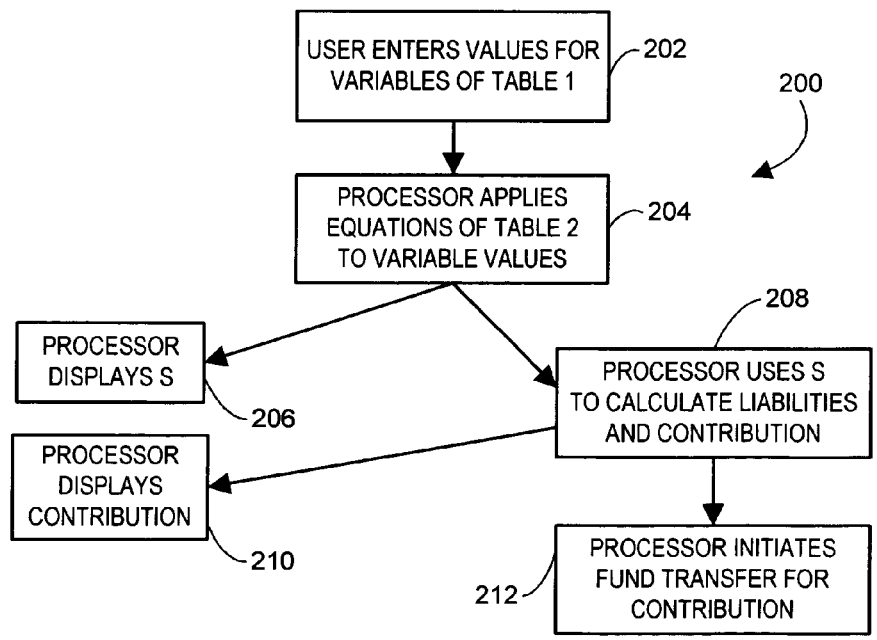
FIG. 2 illustrates the operational flow of one embodiment of the present invention that may be employed by the computer system of FIG. 1.

FIG. 2 illustrates an illustrative operational flow 200 that may be performed by the computer system 100 of FIG. 1. At variable operation 202, the computer system 100 receives any values for variables that have not otherwise been assigned a value. For example, the user 116 may be prompted on the display screen 108 to enter various values and the user then enters the values via the input device 106. As another example, the computer system may query a separate computer system or data source via the NIC 110 to request the values for the one or more variables.

Figure 3:
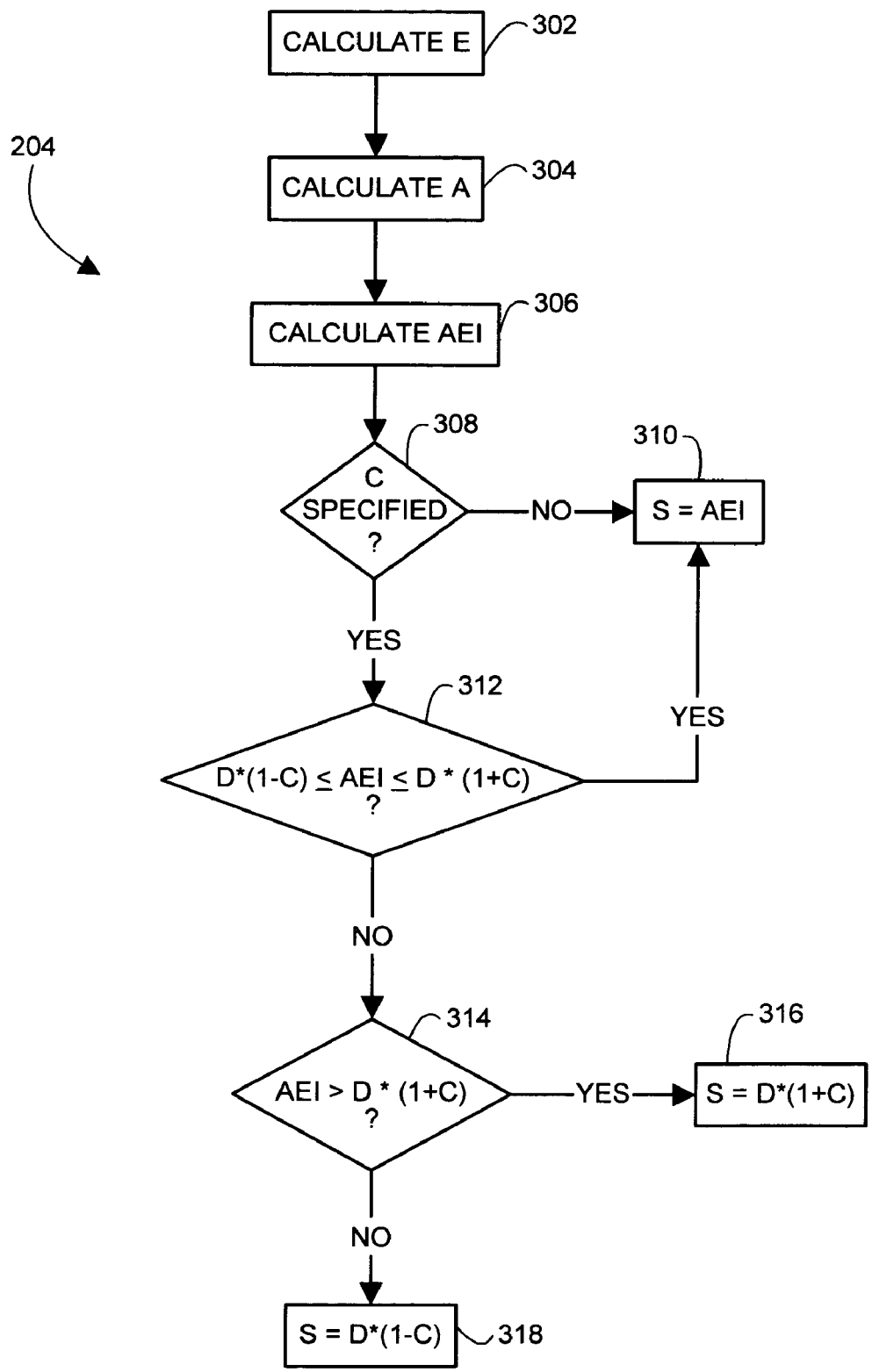
FIG. 3 illustrates the operational flow of one embodiment for finding the smoothed discount rate as employed by the operational flow of FIG. 2.

When all pertinent values have been obtained, such as for the variables of Table 1, the processor 102 for this example then proceeds to calculate S for this particular point in time by applying equations, such as those of Table 2 or their mathematical equivalents, at computation operation 200. An illustrative sequence of the computations based on Table 2 that result in S is shown in FIG. 3, which is discussed in more detail below.

Once S has been computed, the computer system 100 may display the value of S for the user 116 at display operation 206. Additionally or alternatively, the computer system 100 may further compute the liabilities and resulting employer contribution based on the application of S in place of D in the standard actuarial valuations at computation operation 208.

Once the required contribution has been computed, the computer system 100 may then display the amount for the user 116 at display operation 210. Additionally or alternatively, the computer system 100 may further initiate the electronic fund transfer at some appropriate point in the future for the amount of the contribution at transfer operation 212.

While the use of the variables such as those of Table 1 and equations such as those of Table 2 have been discussed in relation to the operation of the computer system 100, it will be appreciated that a user may also employ such variables and equations to compute the value of S, compute the liabilities and resulting employer contribution based on S, and then initiate the fund transfer for the employer contribution to the pension plan without the aid of a computer system 100. Accordingly, the computer system 100 is not intended as a requirement for practicing certain embodiments of the present invention.

Regardless of whether S is found and applied by a computer system 100 or an individual, in this example S may be calculated using the variables of Table 1 and the equations of Table 2 by the logical operations of FIG. 3. These logical operations correspond to the computation operation 204 of FIG. 2 when considered in the context of assistance from computer system 100.

The logical operations begin at calculation operation 302, where E is computed. As discussed above, E is shown in Table 2 as a cumulative value based on compounding the assumed long-term discount rate of return but may also be expressed as a compounded rate of return. A is computed at calculation operation 304, and while A is expressed as a cumulative value based on compounded actual rates of return, A may also be expressed as a compounded rate of return. Based on A and E, AEI is computed at calculation operation 306.

At query operation 308, it is determined whether C has been specified. When specified, C prevents S from being too high or too low relative to D, and operational flow proceeds to query operation 312. When C is not specified, S equals AEI without further regard for D as noted at rate operation 310, and the operational flow for determining S ends. While C is shown as a single value in Table 2 and in FIG. 3, it will be appreciated that there may be a $C_{min}$ and a $C_{max}$ as noted in Table 1 so that S may be bounded by one percentage below D (i.e. $C_{min}$) and by a different percentage above D (i.e., $C_{max}$).

Upon operational flow reaching query operation 312, it is detected whether AEI falls within the upper and lower bounds created by C in relation to D. If AEI does fall within the upper and lower bounds, then S equals AEI as noted at rate operation 310. If AEI does not fall within the upper and lower bounds, then query operation 314 detects whether AEI is greater than the upper bound. If so, then S is equal to the upper bound as noted at rate operation 316. If at query operation 314 it is detected that AEI does not exceed the upper bound, then AEI must exceed the lower bound so that S is equal to the lower bound as noted at rate operation 318.

S is periodically calculated and then applied as shown in FIGS. 2 and 3. A typical time period is one year. Furthermore, N and P of Tables 1 and 2 are typically expressed in years. However, it will be appreciated that S may be calculated at time periods other than whole years, and N and P may be expressed in time periods other than years as well.

To further illustrate the determination of S for a particular point in time, two examples will be discussed. The first example represents determining S after a period of several years of an up market, i.e., a market providing rates of return on investment in excess of D. The second example represents determining S after a period of several years of a down market, i.e., a market providing rates of return on investment less than D. The variables and equations of Tables 1 and 2 are applied.

In example 1, D has been set for the plan as 8% and N has been set for the plan at 30 years. For the last 10 years, the actual return on market value for each year has been 10%. Therefore, there should be recognition that actual future returns must be lower than the assumed long-term discount rate for the assumed long-term discount rate to be accurate.

To find S, P has been chosen for this point in time as 10 years, and C has been chosen as 20%. E is calculated to be 10.0627. The actual return on market value for each of the last 10 years, or P, is 10%. A is calculated to be 2.5937. AEI is calculated to be 7.01%. The upper bound specified by C is calculated to be 9.6% and the lower bound is calculated to be 6.4%. Because AEI falls within the upper and lower bounds, S equals AEI or 7.01%. Therefore, because S is less than D, the liabilities based on S and the resulting employer contributions are larger than what would have resulted had D been applied instead of S. Therefore, during this extended period of an up market when the employer likely has available funds, use of the smoothed discount rate S calls for the employer to use some of those available funds to make larger contributions to the pension plan and to take advantage of contributing during an up market thereby increasing the returns.

In example 2, D has also been set for the plan as 8% and N has also been set for the plan at 30 years. For the last 10 years, the actual return on market value for each year has been 2%. Therefore, there should be recognition that actual future returns must be higher than the assumed long-term discount rate for the assumed long-term discount rate to be accurate.

To find S, P has again been chosen for this point in time as 10 years, and C has again been chosen as 20%. E is again calculated to be 10.0627. The actual return on market value for each of the last 10 years, or P, is 2%. A is calculated to be 1.2190. AEI is calculated to be 11.13%. The upper bound specified by C is calculated to be 9.6% and the lower bound is calculated to be 6.4%. Because AEI exceeds the upper bound, S equals the upper bound or 9.6%. Had there not been a corridor specified, then S would have been AEI or 11.13%. Because S is greater than D, the liabilities based on the S and the resulting employer contributions are smaller than what would have resulted had D been applied instead of S. Therefore, during this extended period of a down market when the employer likely needs to cut expenditures, use of the smoothed discount rate calls for the employer to make smaller contributions to the pension plan, thereby not contributing as much during a down market and decreasing the asset losses.

While the invention has been particularly shown and described with reference to various embodiments thereof, it will be understood by those skilled in the art that various other changes in the form and details may be made therein without departing from the spirit and scope of the invention.

What is claimed is:

1. A computer-implemented method of determining employer liabilities and a resulting contribution to a pension plan, comprising:
   providing a processor configured with a set of instructions that when implemented by the processor comprise the steps of:
   (a) determining a smoothed discount rate based at least on an assumed long-term discount rate and an actual return on market value for one or more time periods that define a look-back period preceding a determination date, comprising:
   (i) determining a compounded expected return over a period of time based on the assumed long-term discount rate;
   (ii) determining a compounded actual return over the look-back period; (iii) computing an adjusted expected rate of return over a future period of time remaining in the period of time based on the compounded expected return and the compounded actual return;
   (iv) based on a corridor C, determining an upper limit and a lower limit of a range about the assumed long term discount rate, where the upper limit equals the assumed long term discount rate times the value (1+C) and the lower limit equals the assumed long term discount rate times the value (1−C); and
   (v) setting the smoothed discount rate when:
   a) the adjusted expected rate of return is less than or equal to the upper limit and greater than or equal to the lower limit, then the smoothed discount rate is set to equal to the adjusted expected rate of return;
   b) the adjusted expected rate of return is greater than the upper limit, then the smoothed discount rate is set equal to the upper limit, and
   c) the adjusted expected rate of return is less than the lower limit, then the smoothed discount rate is set equal to the lower limit; and
   (b) utilizing the smoothed discount rate in place of the assumed long-term discount rate when determining the employer liabilities and the resulting contribution of monies to the pension plan; and
   transferring the resulting contribution of monies to a fund that holds pension plan monies.

2. The computer-implemented method of claim 1, wherein determining the smoothed discount rate further comprises:
   computing a compounded expected return over a period of time based on the assumed long-term discount rate;
   receiving as input the actual return on market value for time periods of a lookback period; and
   computing a compounded actual return over the look-back period.

3. The computer-implemented method of claim 2, further comprising receiving as input the assumed long-term discount rate and the period of time.

4. The computer-implemented method of claim 2, wherein the compounded expected return is expressed as a cumulative value E, the period of time is N, and the assumed long-term discount rate is D, and wherein computing the compounded expected return over the period of time based on the assumed long-term discount rate comprises solving the equation $$E=(1+D)^N.$$

5. The computer-implemented method of claim 2, wherein the compounded actual return is expressed as a cumulative value A, the actual return on market value for time period I is A(I), the look-back period is P, and wherein computing the compounded actual return over the look-back period comprises solving the equation $$A=((1+A(1))*(1+A(2)* \ldots (1+A(P))).$$

6. The computer-implemented method of claim 5, wherein the adjusted expected rate of return over a future period of time is AEI, the compounded expected return is expressed as a cumulative value E, the period of time is N, and wherein computing the adjusted expected rate of return over the future period of time remaining in the period of time comprises solving the equation $$AEI=(E/A)^{(1/(N-P))}-1.$$

7. The computer-implemented method of claim 2, wherein the smoothed discount rate is equal to the adjusted expected rate of return over the future period of time.

8. The computer-implemented method of claim 1, further comprising receiving a value of the corridor as input.

9. The computer-implemented method of claim 1, wherein:
   determining the compounded expected return comprises receiving as input a value therefor;
   and determining the compounded actual return comprises receiving as input a value therefor.

10. The computer-implemented method of claim 1, wherein determining the compounded actual return comprises computing same over the look-back period.

11. The computer-implemented method of claim 10, further comprising receiving as input the look-back period.

12. A computer system for determining actuarial valuations, comprising:
    a processor for implementing a set of instructions; and
    storage containing the set of instructions, wherein when implemented by the processor the set of instructions cause the processor to determine a smoothed discount rate based at least on an assumed long-term discount rate and an actual return on market value, comprising:
    (a) determining a compounded expected return over a period of time based on the assumed long-term discount rate;
    (b) determining a compounded actual return over a look-back period;
    (c) computing an adjusted expected rate of return over a future period of time remaining in the period of time based on the compounded expected return and the compounded actual return;
    (d) based on a corridor C, determining an upper limit and a lower limit of a range about the assumed long term discount rate, where the upper limit equals the assumed long term discount rate times the value (1+C) and the lower limit equals the assumed long term discount rate times the value (1−C); and
    (e) setting the smoothed discount rate when:
    i) the adjusted expected rate of return is less than or equal to the upper limit and greater than or equal to the lower limit, then the smoothed discount rate is set to equal to the adjusted expected rate of return;
    ii) the adjusted expected rate of return is greater than the upper limit, then the smoothed discount rate is set equal to the upper limit, and
    iii) the adjusted expected rate of return is less than the lower limit, then the smoothed discount rate is set equal to the lower limit;

wherein the smoothed discount rate is used in place of the assumed long-term discount rate when determining the liabilities for actuarial valuations.

13. The computer system of claim 12, wherein the processor determines the compounded expected return by:
computing the compounded expected return over a period of time based on the assumed long-term discount rate;
receiving as input the actual return on market value for time periods of the look-back period; and
determining a compounded actual return over the look-back period.

14. The computer system of claim 13, wherein when implemented by the processor the set of instructions further cause the processor to receive as input the assumed long-term discount rate and the period of time.

15. The computer-implemented method of claim 13, wherein when implemented by the processor the set of instructions further cause the processor to determine the compounded actual return by computing same over the look-back period.

16. The computer-implemented method of claim 15, wherein when implemented by the processor the set of instructions further cause the processor to receive as input the look-back period.

17. The computer system of claim 13, wherein the smoothed discount rate is equal to the adjusted expected rate of return over the future period of time.

18. The computer system of claim 12, wherein when implemented by the processor the set of instructions further cause the processor to receive a value of the corridor as input.

19. The computer system of claim 12, wherein:
determining the compounded expected return comprises receiving as input a value therefor; and
determining the compounded actual return comprises receiving as input a value therefor.

20. A method of determining employer liabilities and a resulting contribution to a pension plan, comprising:
choosing a look-back period;
providing a processor configured with a set of instructions that when implemented comprise the steps of:
(a) determining a smoothed discount rate based at least on an assumed long-term discount rate and an actual return on market value for the chosen look-back period, comprising:
(i) determining a compounded expected return over a period of time based on the assumed long-term discount rate;
(ii) determining a compounded actual return over the look-back period;
(iii) computing an adjusted expected rate of return over a future period of time remaining in the period of time based on the compounded expected return and the compounded actual return;
(iv) based on a corridor C, determining an upper limit and a lower limit of a range about the assumed long term discount rate, where the upper limit equals the assumed long term discount rate times the value (1+C) and the lower limit equals the assumed long term discount rate times the value (1−C); and
(v) setting the smoothed discount rate when:
a) the adjusted expected rate of return is less than or equal to the upper limit and greater than or equal to the lower limit, then the smoothed discount rate is set to equal to the adjusted expected rate of return;
b) the adjusted expected rate of return is greater than the upper limit, then the smoothed discount rate is set equal to the upper limit, and
c) the adjusted expected rate of return is less than the lower limit, then the smoothed discount rate is set equal to the lower limit;
(b) utilizing the smoothed discount rate in place of the assumed long-term discount rate when determining the employer liabilities and resulting contribution of monies to the pension plan; and
transferring the resulting contribution of monies to a fund holding pension plan monies.

21. The method of claim 20, wherein:
determining the expected compounded return comprises calculating the expected compounded return on market value over the period of time based on the assumed long-term discount rate; and
determining the compounded actual return comprises calculating the compounded actual return on market value over time periods of the chosen look-back period.

22. The method of claim 21, wherein the expected compounded return is expressed as a cumulative value E, the total fixed period is N, and the assumed long-term discount rate is D, and wherein calculating the expected compounded return over the total fixed period of time based on the assumed long-term discount rate comprises solving the equation $$E=(1+D)^N.$$

23. The method of claim 21, wherein the compounded actual return is expressed as a cumulative value A, the actual return on market value for time period I is A(I), the amount of time of the look-back period is P, and wherein calculating the compounded actual return over the look-back period comprises solving the equation $$A=((1+A(1))*(1+A(2)* \ldots (1+A(P)).$$

24. The method of claim 23, wherein the adjusted expected return over a future period of time is AEI, the expected compounded rate of return is expressed as a cumulative value E, the total fixed period is N, and wherein calculating the adjusted expected return over the future period of time remaining in the period of time comprises solving the equation $$AEI=(E/A)^{(1/(N-P))}-1.$$

25. The method of claim 20, wherein:
determining the compounded expected return comprises receiving as input a value therefor; and
determining the compounded actual return comprises receiving as input a value therefor.

* * * * *